(12) United States Patent
Zedell et al.

(10) Patent No.: US 6,617,824 B1
(45) Date of Patent: Sep. 9, 2003

(54) BATTERY CHARGER POCKET APPARATUS FOR RECEIVING MULTIPLE BATTERY

(75) Inventors: Karl Zedell, Atlanta, GA (US); Anda Stanescu, Lawrenceville, GA (US); Ryan Patrick Rye, Lawrenceville, GA (US); Burton S. Lowry, Antioch, IL (US); Brent W. Thomas, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/083,859

(22) Filed: Feb. 27, 2002

(51) Int. Cl.[7] ................................................. H01M 10/46
(52) U.S. Cl. ....................................................... 320/110
(58) Field of Search ................................ 320/106, 107, 320/110, 112, 116, 113, 99; 429/100

(56) References Cited

U.S. PATENT DOCUMENTS

| | | | |
|---|---|---|---|
| 4,816,735 A | * | 3/1989 | Cook et al. |
| 5,233,281 A | * | 8/1993 | Chiang et al. |
| 5,656,914 A | | 8/1997 | Nagele et al. |
| 5,686,808 A | * | 11/1997 | Lutz |
| 5,686,811 A | * | 11/1997 | Bushong et al. |

* cited by examiner

*Primary Examiner*—Edward H. Tso
(74) *Attorney, Agent, or Firm*—Philip H. Burrus, IV.

(57) ABSTRACT

This invention includes a pocket for a charger that is capable of accommodating a number of different batteries, each battery having a different mechanical and electrical form factor. The pocket includes a pocket divider that may be inserted into multiple pairs of notches. The pocket divider thereby allows the pocket to be reconfigured. The pocket further comprises at least two sets of electrical contacts, and at least two springs for ensuring the proper contact force between a battery and the electrical contacts.

8 Claims, 2 Drawing Sheets

BATTERY CHARGER POCKET APPARATUS FOR RECEIVING MULTIPLE BATTERY

BACKGROUND

1. Technical Field

This invention relates generally to battery chargers that accommodate batteries with differing form factors, and more specifically to electrical and mechanical pocket configurations that are capable of accommodating a plurality of batteries, each battery having a different form factor.

2. Background Art

Electronic devices are becoming more and more prevalent. Everywhere you look, you see people carrying cellular telephones, personal digital assistants, pagers, and two-way radios. While these devices make everyday life more convenient, one drawback to these devices is that they each seem to employ a different battery having a different set of electrical contacts and a different mechanical shape, or "form factor". Consequently, each device, or each battery, must be coupled to a different charger or power supply.

Additionally, in the case of cellular telephones, the demand for cellular phone talk time appears to be outpacing the development in energy storage capacity of electrochemical cells. In other words, people are demanding more energy from a phone in a day than can be delivered by a single cell. For example, with recent declines in cellular telephone rates, some people talk on cellular telephones for five or more hours per day. This demand is present even though a typical cellular telephone battery may only offer about three hours of talk time before a recharge is required.

Some cellular phone manufacturers have attempted to reconcile this problem by making auxiliary batteries that have higher capacities than do standard batteries. For example, Motorola manufactures several different size batteries for its ever-popular StarTac Series phone. The highest capacity battery is commonly referred to as the auxiliary—or "aux"—battery. Unfortunately, however, some people do not own a high-capacity, or "aux", battery. They may only own the standard battery.

As manufacturers offer a plurality of battery form factors for the same phone, a charger is required that will accommodate each of the various form factors in a single pocket. The single pocket is desirable because it prevents the design of the charger from becoming bulky and unwieldy.

One such solution to this "multiple-battery-single-charger" problem is recited in U.S. Pat. No. 5,656,914, assigned to Motorola, entitled, "Battery Charger Having Pocket with Multiple Sets of Charger Contacts." This solution works well for the batteries recited in the specification, because the aux battery that is used with this charger is capable of standing on its end. Thus, the normal battery may be placed horizontally in one part of the pocket while the aux battery may stand in a separate cavity of the patent.

However, as phones have gotten smaller and smaller, some aux batteries are not able to stand on their ends. Further, some manufacturers now desire to have a charger that is capable of charging batteries for a series of phone models. Such a charger would allow a manufacturer to offer a single charger for all its phones, thereby reducing the cost to the end user.

There is thus a need for an improved charger capable of accommodating batteries with differing form factors.

DETAILED DESCRIPTION OF THE INVENTION

Figure 1:
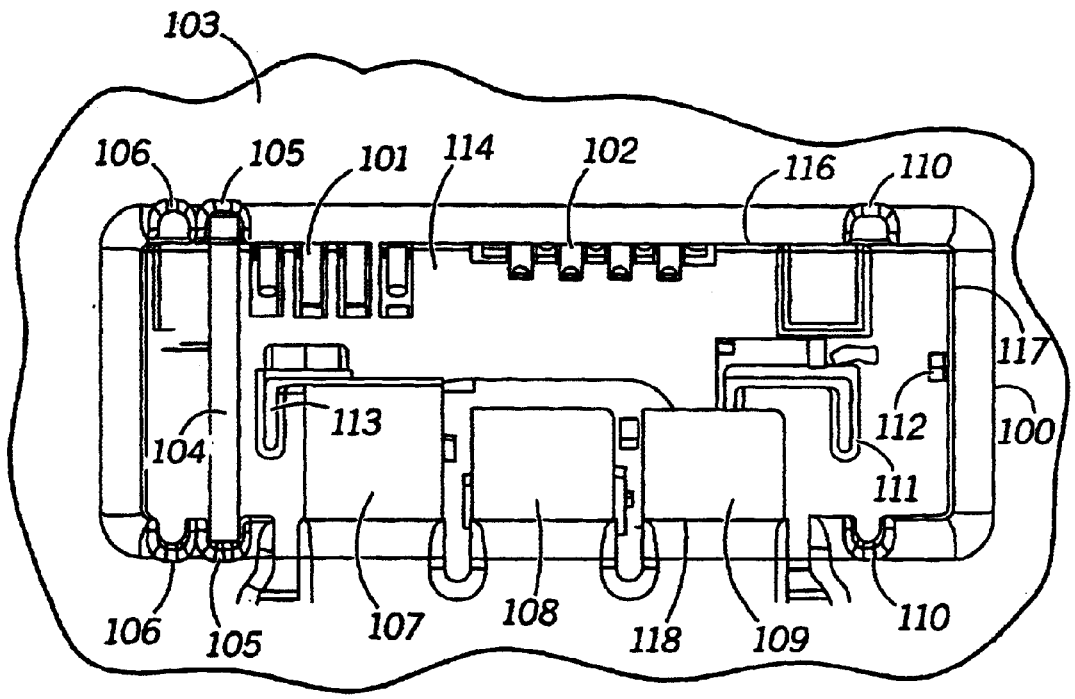
FIG. 1 is a top, plan view of a pocket in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a battery pocket 100 capable of accommodating a plurality of batteries, each having a unique electrical and mechanical form factor. While prior art chargers are generally capable of charging only a single family of batteries, this invention facilitates charging of at least 9 different batteries from at least 9 different phones.

The pocket 100 is preferably made of injection molded plastic, and includes a bottom member 114, and at least four side members 115,116,117,118. The pocket 100 includes apertures for accommodating two separate contact blocks 101,102. It will be clear to those of ordinary skill in the art that more contact blocks could be added to accommodate a broader set of electrical configurations. The contact blocks 101,102 are soldered to a printed circuit board (not shown) disposed within the charger housing 103. The twin contact blocks 101,102 provide electrical coupling between the charging circuitry and the battery contacts. The use of two contact blocks 101, 102 facilitates charging a plurality of electrical form factors in a single, compact pocket.

As different contact blocks are being used, each battery must thus be centered in a different position in the pocket. For this reason, a pocket divider 104 is provided to ensure proper alignment. When a battery having a first form factor is to be charged, the pocket divider 104 is inserted in a first set of notches 105. This reduces the pocket 100 to a first volume. When a battery having a second form factor is to be charged, the pocket divider 104 is inserted into a second set of notches 106. This causes the pocket 100 to take on a second volume. When a battery having a third form factor is to be charged, the pocket divider 104 is inserted into a third set of notches 110, thereby causing the pocket 100 to take on a third volume. The pocket 100 may be designed to accommodate a fourth form factor by removing the pocket divider 104 altogether.

Proper battery to contact block force is required to ensure proper charging. If the force of the battery upon the contacts is too light, a high-impedance connection results. A high impedance connection is not only inefficient, but may also result in little or no charging of the battery. For this reason, three springs 107,108,109 are provided. The springs 107, 108,109 may be made of plastic by tooling the mold for the charger housing 103 to include the cantilever-type leaf springs 107,108,109 upon injection molding.

In one preferred embodiment, springs 108 and 109 each share a common length, while spring 107 is longer than either 108 or 109. The extra length of spring 107 causes the total force applied to the battery by the three springs 107,108,109 in concert to be less than that if the three springs 107,108,109 were each the same length. As today's batteries are very light, having the three springs 107,108,109 the same length may result in a light weight battery being physically ejected from the pocket 100 as a result of the cumulative spring force. The differing lengths prevent such nuisance ejection.

In addition to the springs 107,108,109, the pocket 100 further includes three rib features 111,112,113. The rib features 111,112,113 provide front to back support for some of the batteries, while providing stabilizing support for other batteries.

Figure 2:
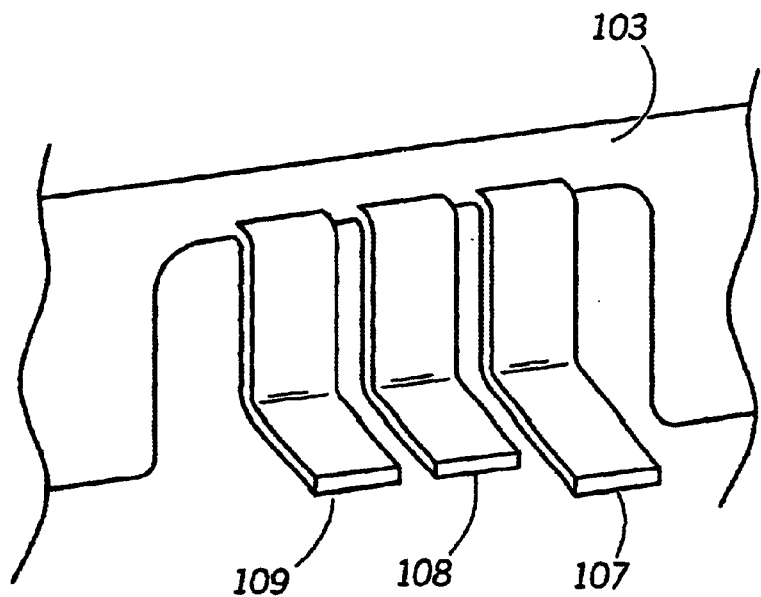
FIG. 2 is an isometric view of springs for a pocket in accordance with the invention.

Referring now to FIG. 2, illustrated therein is one preferred embodiment of the springs 107,108,109. As stated above, the springs 107, 108, 109 are tooled with the plastic battery housing. It will be obvious to those of ordinary skill in the art that the springs could be made of other materials, including metal. Plastic is preferred due to its low cost. Experimental results have shown very good reliability as well, in that plastic was shown to still function properly after 2,500 cycles.

Figure 3:
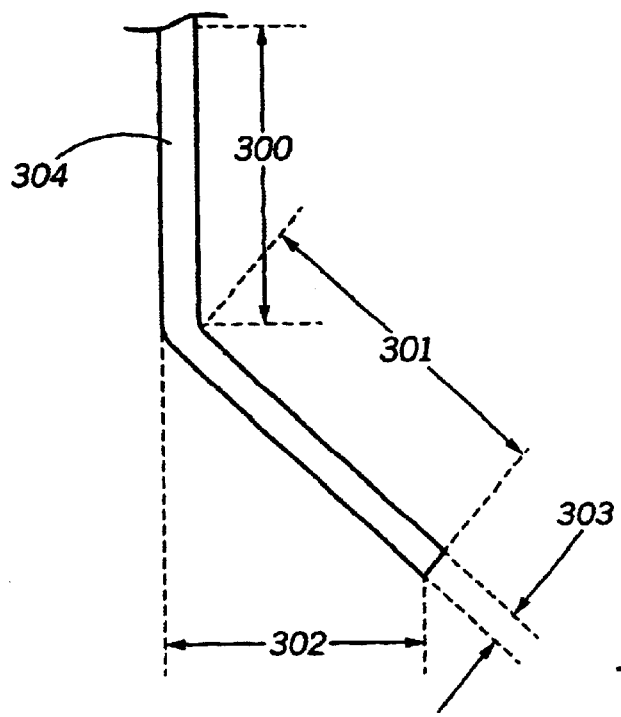
FIG. 3 is one preferred embodiment of a spring in accordance with the invention.

Referring now to FIG. 3, illustrated therein is an exemplary embodiment of a spring 304 that has been demonstrated to work well in the laboratory. For the short spring (elements 108 and 109 in FIG. 2), one preferred embodiment includes length 300 being between 5 and 100 mm, preferably 28.5 mm. Length 301 is between 5 and 100 mm, preferably 35 mm. Length 302 is between 5 and 100 mm, preferably 26.5 mm. Length 303 is between 3 and 15 mm, preferably 7.75 mm.

Figure 4:
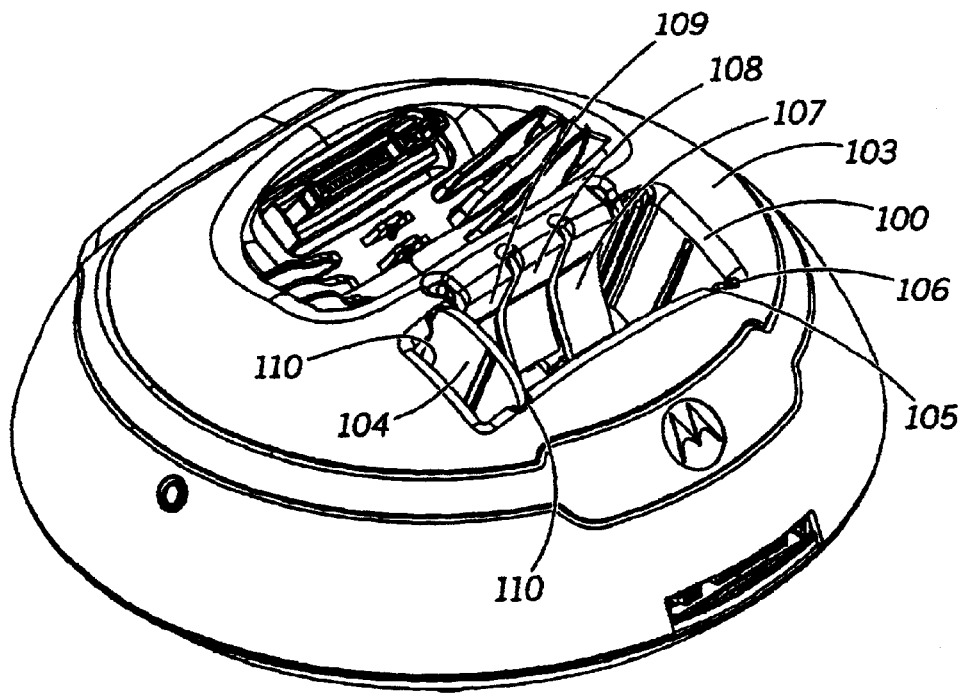
FIG. 4 is an isometric view of an exemplary charger with a pocket in accordance with the invention.

Referring now to FIG. 4, illustrated therein is a charger 400 having a pocket 100 in accordance with the invention. The pocket 100 includes springs 107,108,109 as illustrated in FIG. 3. The pocket divider 104 is inserted into notches 110. Notches 105 and 106 are also shown.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

For example, while one preferred embodiment comprises three sets of notches for the pocket divider, a larger pocket could equally accommodate a larger number of notches, contacts, springs and the like.

What is claimed is:

1. A pocket for accommodating a plurality of batteries in a battery charger, the pocket comprising:
   a. a bottom member and at least four side members;
   b. apertures in the pocket for accommodating at least a first set of electrical contacts and a second set of electrical contacts wherein the aperture for first set of electrical contacts is physically separate from the second set of electrical contacts;
   c. at least a first and second pair of notches disposed in opposing members of the at least four side members;
   d. at least a first and second cantilever spring members, the first cantilever spring member having a first physical dimension and the second cantilever spring member having a second physical dimension; and
   e. a pocket divider, wherein the pocket divider is capable of being inserted into either the first pair of notches or the second pair of notches, thereby altering the volume of the pocket.

2. The pocket of claim 1, further comprising at least two rib members.

3. The pocket of claim 2, further comprising a third pair of notches.

4. The pocket of claim 3, further comprising a third cantilever spring member.

5. The pocket of claim 4, wherein the third cantilever spring member is dimensionally equivalent to the second cantilever spring member.

6. The pocket of claim 5, further comprising a third rib member.

7. The pocket of claim 6, wherein the at least two rib members are disposed on the bottom member of the pocket.

8. The pocket of claim 7, wherein the third member is disposed on one of the at least four wall members.

\* \* \* \* \*